Sept. 3, 1935.  H. E. WARD  2,013,195

EXPANSION JOINT STRUCTURE

Filed April 18, 1935

INVENTOR,
Howard E. Ward.
BY
*Hovey & Hamilton,*
ATTORNEYS.

Patented Sept. 3, 1935

2,013,195

UNITED STATES PATENT OFFICE 2,013,195

EXPANSION JOINT STRUCTURE

Howard E. Ward, Kansas City, Mo.

Application April 18, 1935, Serial No. 16,997

6 Claims. (Cl. 14—16)

This invention relates to expansion joint structures in the nature of those set down in my United States Letters Patent Number 1,799,574, issued April 7, 1931, and the primary object of this invention is to provide improvements in such expansion joints as will overcome certain shortcomings experienced in the manufacture, installation and use of the expansion joint as it is shown and described in the aforesaid Letters Patent.

It has been found desirable to provide separate means for interconnecting the diagonally arranged tread links and the spaced bearing sills so that in the event of the shearing or otherwise destroying one of the connecting members, the same may be replaced without having to remove the entire tread link.

One of the aims of the invention, therefore, is the provision of separate means for connecting together the tread links and bearing sills, said means being in the form of a bolt, about which is coiled a spring, to the end that longitudinal movement of the pin or bolt is permitted when the expansion joint is in position and as contraction and expansion takes place.

Another object of this invention is the provision of connecting bars which join proximal bolts to hold them in proper spaced relation when the spaced-apart bearing sills move toward and from each other during expansion and contraction of the entire bridge structure with which the expansion joint is associated.

The manner of constructing an expansion joint contemplated by the invention will become apparent during the course of the following specification, referring to the accompanying drawing, wherein.

Figure 1:
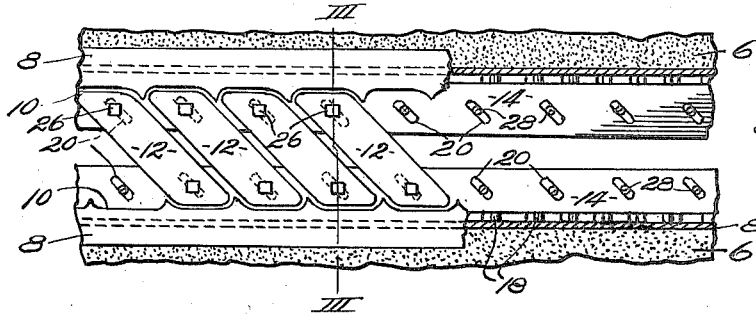
Figure 1 is a fragmentary, top plan view of an expansion joint showing the same installed on a bridge or the like, parts being broken away for clearness.
Figure 2:
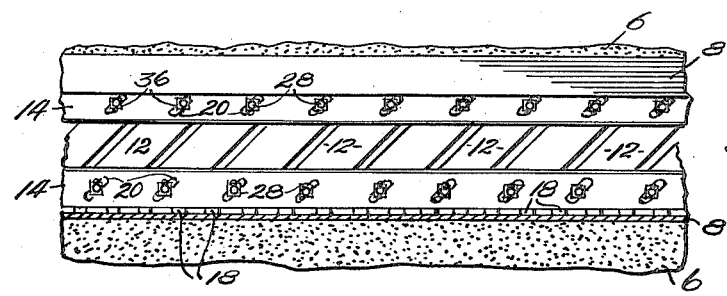
Fig. 2 is an inverted plan view of a section of the expansion joint in place.
Figure 3:
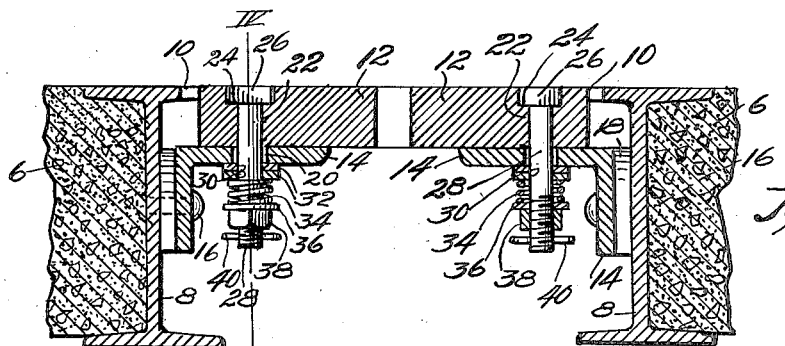
Fig. 3 is an enlarged, fragmentary, cross sectional view through the expansion joint, taken on line III—III of Fig. 1, and, Fig. 4 is a detailed sectional view taken on line IV—IV of Fig. 3.
Figure 4:
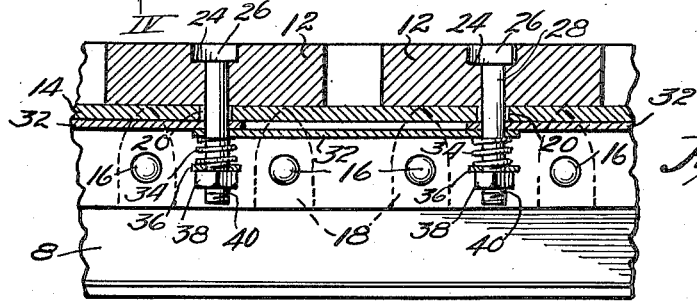

The proximal spaced-apart ends of the bridge sections comprise the pavement which are faced with I-beams or similar means 8, the upper walls of which are provided with cutaway portions 10, within which fit the ends of the diagonally arranged, spaced-apart tread links 12. Bearing sills in the form of angle irons 14 are riveted or otherwise rigidly secured to I-beams 8 by rivets 16 and these sills 14 are held in spaced relation to the wall of I-beams 8 by specially formed elements 18. These elements are pointed at their upper ends so that grit, dirt, or other foreign particles which may fall down upon the top of bearing sills 14, might escape therefrom between these elements 18.

The bearing sills 14 are provided with diagonally formed slots 20 that are normally parallel to the longitudinal axis of links 12. Each link 12 has an opening 22 formed therethrough adjacent each end respectively and these openings 22 are respectively in register with slots 20 when links 12 are in the operative position. The upper part of openings 22 is greater in diameter than the remaining portion thereof to form a shoulder 24, against which may rest the under face of the head 26 of bolt 28.

These bolts 28 extend down through slot 20 and through the perforations 30 formed through connecting bars 32. These connecting bars are of a predetermined length and join the proximal bolts so as to maintain them in a given, spaced-apart relation. The bolts normally carry two overlapped connecting bars 32 and these bars are maintained against the under side of the bearing sill 14 by a spring 34 which is coiled about bolt 28 between bars 32 and a washer 36. This spring 34 yieldably maintains the bolt 28 in its operative position, yet allows its movement longitudinally, which movement is transversely through the tread link 12 and bearing sill 14. A nut 38 is in screw threaded engagement with the threaded portion of bolt 28 and the tension of spring 34 may be varied by manipulating this bolt. A cotter key 40 is passed transversely through bolt 28 to preclude complete displacement of nut 38.

It has been found that as the bridge sections move during expansion and contraction they will likewise raise and lower to some extent and more complete freedom of movement in the joint between the ends of links 12 and bearing sill 14 is desirable and accomplished by the structure just above set down. When a bolt 28 is sheared or becomes ineffective for any reason it may be quickly replaced. The upper end of opening 22 between shoulder 24 and the top of link 12 should be polygonal in cross section and of a shape like the head 26 of bolt 28. Thus when assembling the structure the bolts may be dropped to position from the floor of the bridge and then the workmen can place bars 32, springs 34, washers 36, nuts 38 and cotter keys 40 from a place beneath the expansion joint.

As expansion and contraction takes place, bolts 28 move along slots 20 and connecting bars 32 serve to keep all of the bolts 28 in their properly spaced relation so that binding will not occur to preclude the pivotal action which is desirable as the contraction and expansion occurs.

From the foregoing it is to be observed that these refinements in construction are highly advantageous and not only render the expansion joint easier to assemble, cheaper to manufacture and more positive in its action, but insures that the parts thereof will last longer and be replaceable at a comparatively low figure.

Having thus described the invention, what is claimed as new and desired to be secured by Letters Patent is:

1. An expansion joint structure comprising a pair of spaced bearing sills; a plurality of diagonally arranged spaced tread links spanning the space between and carried by the bearing bars; and means for interconnecting the links and sills comprising transverse pins passing through the same, and resilient means bearing against the respective pins to permit their longitudinal movement.

2. An expansion joint structure comprising a pair of spaced bearing sills; a plurality of diagonally arranged spaced tread links spanning the space between and carried by the bearing bars; registering openings provided in the said sills and tread links; a pin extending through said respective registering openings; a spring bearing against each of said pins respectively to permit their longitudinal movement; and means for varying the tension of the spring.

3. An expansion joint structure comprising a pair of spaced bearing sills; a plurality of diagonally arranged spaced tread links spanning the space between and carried by the bearing bars; registering openings provided in the said sills and tread links; a pin extending through said respective registering openings; a spring bearing against each of said pins respectively to permit their longitudinal movement; and connecting bars joining said pins.

4. An expansion joint structure comprising a pair of spaced bearing sills; a plurality of diagonally arranged spaced tread links spanning the space between and carried by the bearing bars; registering slots and holes provided in the said sills and tread links respectively; a bolt extending through said respective registering slots and holes; a spring coiled about each bolt respectively; and a nut on the bolt to vary the tension of the said spring and thereby the force exerted to hold together the said sill and tread link at the zone of connection.

5. An expansion joint structure comprising a pair of spaced bearing sills; a plurality of diagonally arranged spaced tread links spanning the space between and carried by the bearing bars; registering slots and holes provided in the said sills and tread links respectively; a bolt extending through said respective registering slots and holes; a spring coiled about each bolt respectively; a nut on the bolt to vary the tension of the said spring and thereby the force exerted to hold together the said sill and tread link at the zone of connection; and connecting bars joining said bolts provided with openings to receive the said bolts, said bars being of a length to maintain proximal bolts in spaced relation.

6. In an expansion joint structure having a pair of spaced-apart sills provided with spaced-apart openings therethrough and diagonally arranged spaced tread links spanning the space between and carried by the bearing bars provided with internally shouldered openings at each end thereof respectively, a screwthreaded bolt passing through registered openings in sill and link; a spring coiled about said bolt; and a nut in screwthreaded engagement with the bolt to vary the tension of said spring, said bolts respectively having a head thereon resting upon the said shoulders within the respective openings.

HOWARD E. WARD.